United States Patent [19]

Laurette et al.

[11] Patent Number: 4,623,218
[45] Date of Patent: Nov. 18, 1986

[54] OPTICAL FIBRE CABLE AND METHOD OF AND APPARATUS FOR DETERMINING LOCATION OF A BREAK THEREIN

[76] Inventors: Michel Laurette, 16, allée des Charmes, Les Clayes-sous-Bois, France, 78340; Marc P. Lenoir, 19, rue Borromée, Paris, France, 75015

[21] Appl. No.: 348,767

[22] Filed: Feb. 16, 1982

[30] Foreign Application Priority Data

Feb. 20, 1981 [FR] France ............... 81 03441

[51] Int. Cl.⁴ ............................................. G02B 6/44
[52] U.S. Cl. ......................................... 350/96.23
[58] Field of Search ............... 350/96.23; 174/70 R; 307/97, 99, 125

[56] References Cited

U.S. PATENT DOCUMENTS

| | | | |
|---|---|---|---|
| 3,496,381 | 2/1970 | Wisnia | 307/125 |
| 3,774,191 | 11/1973 | Enemark | 307/125 |
| 4,012,149 | 3/1977 | Bouillie et al. | 356/237 |
| 4,287,513 | 9/1981 | Lam et al. | 307/125 |
| 4,293,852 | 10/1981 | Rogers | 307/125 |

FOREIGN PATENT DOCUMENTS

| | | |
|---|---|---|
| 441754 | 2/1967 | Japan ............... 174/37 |
| 2001777 | 2/1979 | United Kingdom . |
| 2021282 | 11/1979 | United Kingdom . |
| 2064811 | 6/1981 | United Kingdom . |

OTHER PUBLICATIONS

R. F. Gleason, R. C. Mondello, B. W. Fellows, and D. A. Hadfield, "Design and Manufacture of an Experimental Lightguide Cable for Undersea Transmission Systems," Nov. 1978, pp. 385–389.

Primary Examiner—James W. Davie
Assistant Examiner—Robert E. Wise
Attorney, Agent, or Firm—Lowe, Price, LeBlanc, Becker & Shur

[57] ABSTRACT

An optical fibre cable based on a known structure includes at least one electrical lead having an elongation on break less than or approximately equal to that of the optical fibres. This lead is inserted for example in a groove of the grooved cylinder of a cable core. The electrical lead is subject to irreversible deformation to act as a mechanical "fuse". It may be fractured in the vicinity of a crack or break in an optical fibre of the cable that has been subjected to a tensile force greater than or approximately equal to that corresponding to its elongation on break. This arrangement enables the break location in the optical fibre to be determined by measuring the capacitance between the electrical lead and a metallic member included in the cable.

27 Claims, 7 Drawing Figures

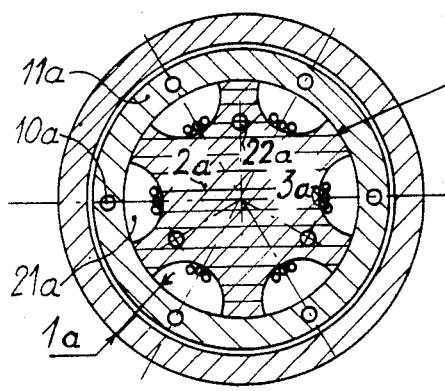
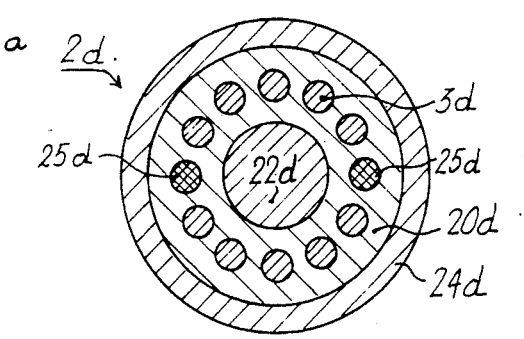
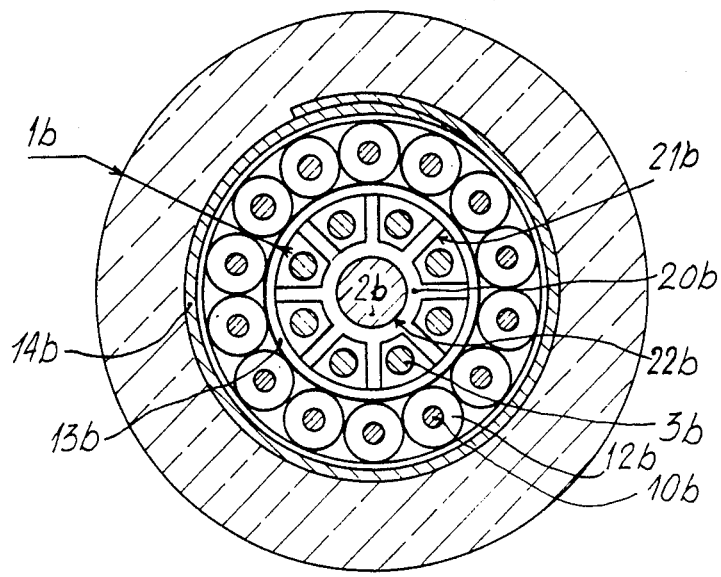
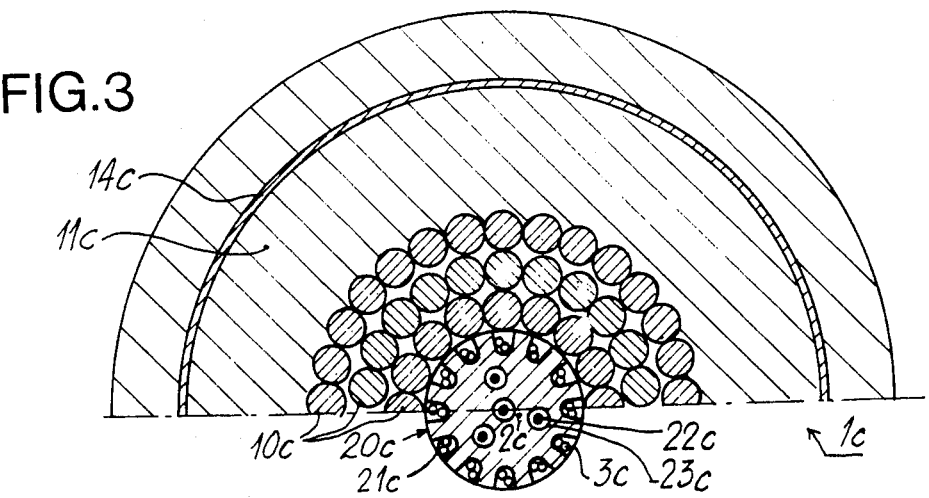

OPTICAL FIBRE CABLE AND METHOD OF AND APPARATUS FOR DETERMINING LOCATION OF A BREAK THEREIN

BACKGROUND OF THE INVENTION

1. Field of the Invention

The present invention relates to an optical fibre cable which comprises at least one metallic member. More particularly, it the prevention and location of breaks or cracks in one optical fibre of the cable which has been subjected to the effects of tension. Although the invention falls within the general scope of ground or submarine optical fibre cables, reference will chiefly be made hereinafter to submarine cables that experience considerable mechanical strains, due to high submarine pressures reaching 6 to 8 daN/mm$^2$.

2. Description of the Prior Art

It is known that a submarine cable, during laying and/or raising, withstand tensile strengths having values depending, inter alia, on the ocean depth at the laying or raising location. These strengths reach a maximum in the portion of the cable nearest the surface of the ocean. When laying or raising the cable in great depths (6000 meters), the mechanical strains give rise to local elongated effects which depends on the features of the cable. The average values for these elongations are estimated at 0.3 and 1 percent respectively under conventional laying and raising conditions using a cable-ship. Furthermore, the heaving and pitching movements of a cable-ship caused by ocean swell bring about transient increases in the cable tension. Calculations show that additional transient elongations of upto 0.2% are to be expected when laying or raising the cable in heavy weather conditions.

As a result, an underwater optical fibre cable must withstand elongations of greater than 1% without breaking or embrittling of the optical fibres it contains.

The known structures of underwater optical fibre cables are, moreover, designed to minimize any elongations and hence stresses sustained by the optical fibres when the cable is stretched.

It may be added that fibre lengths of upto a few kilometers can now be manufactured that display relatively high mechanical features, capable of withstanding elongations of some 5%.

The problem, nonetheless, still exists of industrially producing very long lengths of fibres capable of withstanding considerable elongations with no risk or breakage. The on-going debugging operations, for instance, on these long lengths of fibre, intended for testing the fibre tensile strength, could also quite well produce undesirable embrittlement of the fibre by crack growth (without breakage) in the course of the test.

The possibility of a break in the fibres occuring during a laying or raising operation cannot therefore be excluded.

There may well also be embrittlement of the fibres—crack grouwth without breakage—due to excessive local elongation in the cable during these operations. As the fibres in a cable are always undergoing some strain, the static fatigue phenomenon—long term fibre breakage at low strain as a result of slow crack growth—could come about in those sections where the cable has been overstretched thus leading to subsequent fibre breakage in the laid cable.

In the event of a breakdown in the transmission of optical signals conveyed by a cable optical fibre, following a break in a fibre without breakage of the cable, means must be available for locating the position where the break has occured with a view to raising and repairing the corresponding portion of the cable.

When the cable is short and does not require repeaters, the break in an optical fibre can be located by a back-diffusion procedure, as set forth in U.S. Pat. No. 4,012,149. A light impulse is supplied the fibre through an accessible end of the cable, such as a terminal station, and is reflected by the break back to that station. From the propagation time measurement between emission and reception of the light impulse, the distance between the break and the terminal station is deduced.

On the other hand, when the cable is long and includes repeaters, an optical remote-location system for finding fibre breaks would require repeater structures of a complexity such that there would be no advantage to be gained in comparison with the advantages set forth here. Back-diffusion means would have to be introduced into each repeater that would be capable of testing each optical fibre from the repeater and the information obtained would then be transmitted to the terminal station.

OBJECTS OF THE INVENTION

The main object of this invention is to introduce into an optical fibre cable having a known structure, a member that does not rely on optical signal transmission and affords a mechanical feature having an irreversible variation responsive to a tension in the cable causing breakage of an optical fibre.

Another object of this invention is to remote locate a break or crack in an optical fibre of an optical fibre cable by straight-forward known measurement means.

SUMMARY OF THE INVENTION

In accordance with the invention, a conventional optical fibre cable having at least one metallic member is modified to include at least one electrical lead that has an elongation on break which is less than or substantially equal to that of the optical fibres of the cable.

It is a known fact that the majority of optical fibre cables, especially submarine cables, generally includes several metallic members that provide a "strength" structure of the cable. The elongation on break of these metallic members is much greater than that of the optical fibres. The effects of tension can cause cracks or breaks in the fibres without causing breaks in the cable. The metallic members can, for instance, be metal strands which are included in the composite core or in the composite sheath of the cable or can constitute metallic wire bundles or a metallic jacket partly making up the core or sheath of the cable.

The deformation in the electrical lead embodying the invention is irreversible in that the lead acts as a mechanical 'fuse' and is broken in the vicinity of the crack or break in an optical fibre that has been submitted to a tensile force greater than or approximately equal to that corresponding to its elongation on break. The invention then brings into play known means for locating breaks in an electrical lead of a conventional electrical cable. Indeed, in order to locate the break in the electrical lead embodying the invention and hence the break in an optical fibre, the capacitance of a capacitor formed by the electrical lead and of the metallic members of the cable, merely has to be measured at one of the cable ends. This measurement is carried out by means of a calibrated-resistor Thomson bridge. By knowing the linear capacitance of said capacitor due to its construction or through prior measurements, the distance between the fibre breaking point and the terminal station is deduced directly from the capacitance measurement.

When the cable is long and therefore includes repeaters, the electrical continuity in the electrical lead embodying the invention and the metallic member forming the measuring capacitor is provided by two conductive sections that are inserted into each repeater box and are respectively connected to the electrical lead and the metallic member of the two cable sections adjacent to the repeater. Thus, each repeater includes two conductive sections for linking the electric leads in the cable sections adjacent a particular repeater.

It will be noted that breakage of the electrical lead embodying the invention makes it possible to locate a break in the optical fibres, i.e. in fact an internal crack in the cable without the cable having broken. Several such electrical leads may be inserted in the cable so as to average the location area where a break or breaks in one or several optical fibres have occurred.

BRIEF DESCRIPTION OF THE DRAWING

The foregoing and other objects, features and advantages of this invention will be apparent from the following more particular description of preferred embodiments of the invention in reference to the corresponding accompanying drawings, in which:

FIG. 1 is a cross-sectional view of a ground optical fibre cable with a one-piece core;

FIG. 2 is a cross-sectional view of a ground optical fibre cable with a coaxial core including a central metallic wire;

FIG. 3 is a cross-sectional half-view of a submarine optical fibre cable with a sheath comprising a tubular wire-bundle;

FIG. 4 is a cross-sectional view of the core of an optical fibre cable having optical fibres embedded in an elastomer product;

Figure 5:
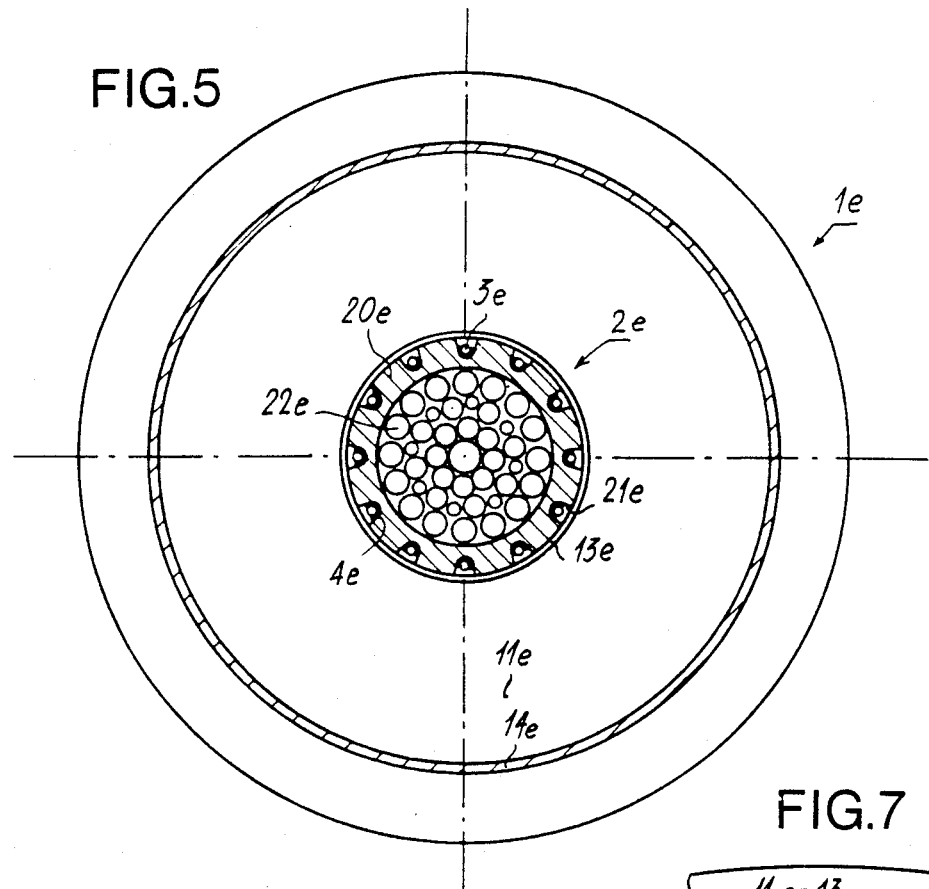
FIG. 5 is a cross-sectional view of a submarine optical fibre cable having a central "strength" wire-bundle.

The known structures of optical fibre cables can be grouped into two categories depending on whether the metallic strength members of the cable are positioned around the periphery or at the center of the structure. Generally speaking, an optical fibre cable structure comprises a core 2 that contains optical fibres equi-distributed around the core circumference, and a protective composite sheath 1 that envelops central core 2 and includes several jackets for the metallic and insulating parts.

The cable structures depicted in FIGS. 1 to 3 are of a first category and are broadly similar to those set forth in French Pat. No. 2,312,788, French Patent Application No. 2,288,318 and UK Patent Application No. 2,021,282 A respectively. The structures shown in FIGS. 1 and 2 are intended for ground cables whereas that shown in FIG. 3 is generally employed for a submarine cable.

In the structures of FIGS. 1, 2 and 3, the strength members are respectively included in composite sheaths 1a, 1b and 1c. In FIG. 1, the strength members include longitudinal metallic strands 10a that are equi-distributed circularly and embedded in an insulating jacket 11a which surrounds central core 2a. In FIG. 2, the strength members are electrical leads 10b that are each bound in insulating cladding 12b and which encircle central core 2b via a synthetic jacket or braiding 13b. Certain leads 10b can transmit the remote supply current to the cable repeaters. In FIG. 3, the strength members consist of several tubular layers of helical steel wires 10c that may be embedding in an insulating jacket or matrix 11c surrounding central core 2c or that may form a strength tube between core 2c and an insulating jacket 11c. The strength tube of wires 10b, 10c is often enclosed in a thin tubular jacket 14b, 14c made of metal.

In the invention, one or several metallic members, such as 10a, 10b, 14b; 10c, 14c of composite sheath 1a; 1b; 1c constitute one or several electrical leads having an elongation on break which is less than or approximately equal to that of optical fibres 3a; 3b; 3c respectively. In other words, one of the strength members 10a, 10b and 10c is replaced with an electric lead having an elongation on break equal to or less than that of fibres 3a, 3b and 3c, respectively, or jackets 14b and 14c are selected from metal materials having such an elongation property.

The central core is chiefly comprised of grooved cylinder 20a, 20b, 20c as indicated in FIGS. 1, 2, 3. Each groove 21a, 21b, 21c is generally helical and respectively lies in the outside peripheries of cylinders 20a, 20b and 20c. One or several optical fibres 3a, 3b, 3c are laid in each groove.

In FIGS. 1 and 3, cylinder 20a, 20c as illustrated is full and is be made of an insulating material, such as plastic, or of a metallic material. When the cylinder 20a or 20c is made of plastic, it is preferably reinforced with metallic strands 22a, as shown in FIG. 1, that are evenly spaced around the center of the cylinder. Should the cylinder be metal, one or several strands 22c are used, as shown in FIG. 3 each of strands 22 is enveloped in an insulating cladding 23c.

As depicted in FIG. 2, grooved cylinder 20b is hollow and peripheral grooves 21b are formed by machining or by circularly placing folded U- or V-shaped strips side by side, as described for example in UK patent application No. 2,001,777 A. The cylinder 20b is coaxial with a central metal wire 22b that can be enveloped in an insulating cladding and is intended in certain embodiments for transmitting the remote supply current to the repeaters.

According to the invention, at least one of members 22a, 22b, 22c in the core 2a, 2b, 2c constitutes an electrical lead having an elongation on break which is less than or approximately equal to that of optical fibres 3a, 3b, 3c, respectively.

Still within the scope of the first category, cylinder 20c in FIG. 3 may be replaced by a sealed synthetic tube containing a hydrophobic or viscous liquid in which the optical fibres are embedded as set forth in UK patent application No. 2,021,282 A. The central core, such as core 2d, illustrated in FIG. 4, can also comprise a tubular elastomer layer 20d that envelops a central steel wire 22d and that is enveloped by a thin nylon tube 24d, as described in the article by R. F. Gleason, R. C. Mondello, B. W. Fellows and D. A. Hadfield, Proceedings of the 27th International Wire and Cable Symposium, Cherry Hill, N.Y., Nov. 14–16, 1978, Pages 385 to 389.

The elastomer layer 20d in the center encloses optical fibres 3d.

According to the invention, in the hydrophobic or viscous liquid or in the elastomer layer can be embedded one or several electrical leads such as 25d whose elongation on break is less than or approximately equal to that of optical fibres 3d. An electrical lead having an elongation value such as this can, however, be formed by central wire 22d. Such an electrical lead can also constitute outer tubular envelope 24d around core 2d.

The second structural category is depicted in FIG. 5, in accordance with UK patent application No. 2,064,811 A. The strength members constitute central core 2e of the cable. Core 2e comprises a central bundle of helically wound steel wires 22e core 2e is surrounded by a metallic tube 20e formed of metal wires. Core 2e has peripheral helical grooves 21e, each of which contains one or several optical fibres 3e. Composite sheath 1e of the cable in FIG. 5 further comprises a first metallic jacket, formed as inner strip 13e, and a second metallic jacket 14e that surrounds the strip 13e through an intermediate insulating jacket 11e. Strip 13e is preferably very strong for a submarine cable, and closes the fibre receiving grooves 21e. Jackets 13e and 14e are formed of many separate metal wires.

According to the invention, at least one of the metallic wires of the bundle 20e and/or at least one of metallic jackets 13e, 14e is an electrical lead having an elongation on break less than or approximately equal to that of optical fibres 3e.

Figure 6:
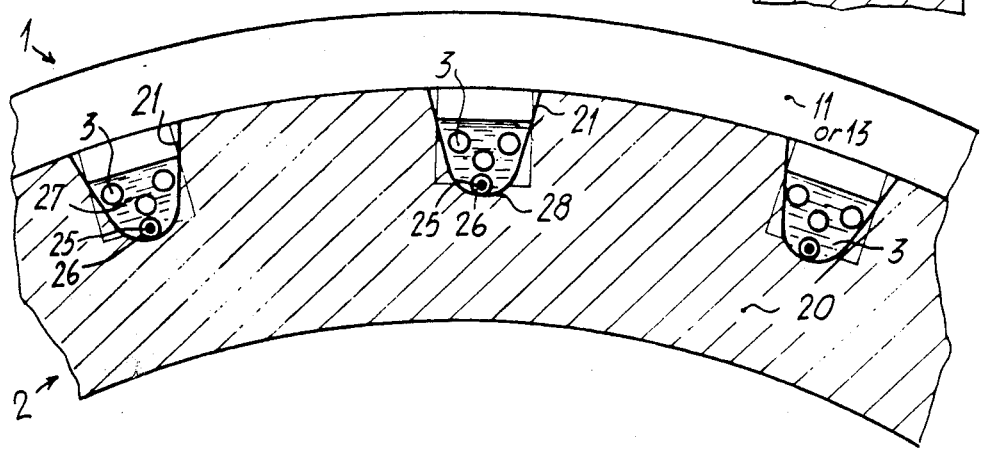
FIG. 6 is a cross-sectional view of a part of a grooved cylinder of the core of an optical fibre cable similar to that illustrated in FIG. 5.

Preferably an electrical lead embodying the invention is inserted in the jacket which contains the optical fibres, such as jacket 25d, FIG. 4, so that the lead is subjected to the same stresses as those experienced by the optical fibres. Consequently, when the core of cable 1 comprises grooves 21, at least one of these grooves or preferably, each groove, contains a lead 25 as illustrated in FIG. 6. Electrical lead 25 is surrounded by an insulating cladding 26 that is embedded, like fibres 3, in a jelly, grease, expanding product or some similar medium 27. The viscous product 27 preferably fills at least the portion 28 of the grooves whilst avoiding contact with outer jacket 11 or 13 of the composite sheath 1 that closes grooves 21 in order that the stresses exerted on the outer jacket not be transmitted to the optical fibres.

According to the invention, the cladding 26 is made of a material having a relatively high compression strength, preferably based on polypropylene or high density polyethylene.

However, for ease in determining the linear capacitance between an electrical lead 25 and a metallic member initially included in the cable, such as jacket 20 in FIG. 6, as is attained by maintaining the capacitance substantially constant in normal operation, it is preferable for lead 25 to be anchored to a wall of the groove 21, by bonding for example; preferably lead 25 is bonded to bottom portion 28 of the groove as shown in FIG. 6.

Figure 7:
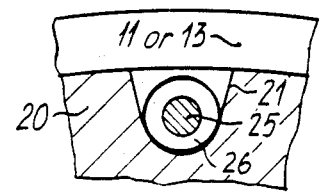
FIG. 7 is a cross-sectional view of a groove in a cable core similar to that illustrated in FIG. 5 and containing only one electrical lead embodying the invention.

Lead 25 can be also anchored by locating and eventually bonding lead 25 in a groove 21, as illustrated in FIG. 7. In the latter case, the cladding 26 of the electrical lead 25 has a diameter practically equal to the width of the groove and is not always in contact with the jacket 11 or 13 that closes the grooves; the groove in question does not house any optical fibres.

As already pointed out, an electrical lead embodying the invention must exhibit an elongation on break that is of the same order of magnitude as that of the optical fibres. In other words, this elongation on break must be always less than that of the metallic members making up the load bearing parts of the cable and can be less than or practically equal to that of the optical fibres. Exemplary of materials that can be used as electrical leads in the invention are one of the standard compound materials, set forth in the table below, in relation to optical fibres which have elongations on break of about 1 to 7%.

| Electrical lead material | Type | Elongation on break |
|---|---|---|
| Hard laminated copper (work-hardening ratio > 50%) | | ≈3% |
| Hard-variety brass wire with 40% | U-Z40 | |
| Hard-variety brass wire with 36% | U-Z36 | |
| Hard-variety brass wire with 33% | U-Z33 | ≈1% |
| Hard-variety brass wire with 15% | U-Z15 | |
| Hard-variety brass wire with 10% | U-Z10 | |
| Hard-variety bronze wire with 5% tin and 4% zinc | U-E5Z4 | ≈1% |
| Hard-variety brass wire with 13% zinc | U-Z13 | ≈5% |
| Hard-variety brass wire with 38% zinc and 1% lead | U-Z38Pb1 | ≈8% |
| Hard-variety aluminium alloy wire | 3003 | |
| Hard-variety aluminium alloy wire | 5005 | ≈2% |
| Hard-variety aluminium alloy wire | 5251 | |
| Hard-variety aluminium alloy wire | 1100 | |
| Hard-variety aluminium alloy wire | 1050A | ≈3% |
| Hard-variety aluminium alloy wire | 1080A | |
| Hard-variety laminated aluminium alloy with 99% aluminium | | ≈3% |

It will be noted, that all optical fibre cable structure stemming from a combination of the above-described structures fall within the scope of the invention. Such combined structures come within the domain defined by the claims appended hereto.

What we claim is:

1. A method for enabling the location of a break in a longitudinal extending fiber optic element of an optical fiber cable to be determined, the cable including: (a) a longitudinally extending electric lead having an elongation on break no greater than that of elongated optical fibers in the cable so that if the fiber optic element is broken, the lead is broken in the vicinity of the break of the fiber optic element, (b) a longitudinally extending electric conductor having an elongation on break greater than the elongation on break of the optical fibers and the electric lead in the cable, the cable having electric capacitance between the electric conductor and the electric lead, the capacitance between the electric conductor and the electric lead being reflected to end terminals of the electric lead and electric conductor such that the reflected capacitance at the end terminals of the electric lead and electric conductor changes in response to the break and the magnitude of the reflected capacitance is indicative of the location of the break, the method comprising the step of monitoring the magnitude of the reflected capacitance at the end terminals of the electric lead and the electric conductor between the electric lead and the electric conductor, the magnitude of the monitored reflected capacitance at the end terminals enabling the location of the break of the fiber optic element to be determined.

2. The method of claim 1 further including the step of responding to the monitored capacitance to indicate the location of the break in the fiber optic element.

3. An optical cable having built in structure for enabling the location of a break in a fiber of the cable to be determined comprising a central core carrying plural longitudinally extending optical fibers at spaced angular intervals, an insulating jacket surrounding the central core, portions of the core and jacket abutting against each other, metallic longitudinally extending members embedded in at least one of the core and jacket at spaced angular intervals, one of said members being an electric lead having an elongation on break which is no greater than the elongation on break of the optical fibers, others of said members being electric leads that strengthen the cable and have an elongation on break much greater than that of the optical fibers, the effects of tension on the cable tending to causes cracks or breaks in the fibers without causing breaks in the cable, the electric lead having an elongation on break no greater than the elongation on break of the optical fibers breaking in the vicinity of the crack or break of the optical fiber, the cable, electric lead having a tendency to break and strengthening lead being constructed and arranged so that electric capacitance at one end of the cable between the electric lead having a tendency to break and one of the strengthening electric leads provides an indication of the location of the break.

4. The optical cable of claim 3 further including means at said one end of the cable for measuring the capacitance between the electric lead having a tendency to break and said one strengthening lead.

5. An underwater optical cable having built in structure for enabling the location of a break in the cable to be determined comprising a central region through which extend plural elongated strengthening metal wires, a metal jacket surrounding the central region including a periphery remote from the central region, said periphery having multiple grooves at spaced angular intervals, said grooves carrying elongated optical fibers, at least one of said grooves carrying an electric lead having an elongation on break which is no greater than the elongation on break of the optical fibers, the electric lead being insulated from the metal jacket, the metal jacket having an elongation on break much greater than that of the optical fibers, the effects of tension on the cable tending to cause cracks or breaks in the fibers without causing breaks in the cable or jacket, the electric lead having an elongation on break no greater than the elongation on break of the optical fibers breaking in the vicinity of the crack or break of the optical fiber, the cable, electric lead having a tendency to break and the jacket being constructed and arranged so that electric capacitance at one end of the cable between the electric lead having a tendency to break and the jacket provides an indication of the location of the break.

6. The cable of claim 5 wherein the insulated metal lead is fixedly secured to the bottom of the groove.

7. The cable of claim 6 wherein the metal lead is surrounded by an insulating cladding having a relatively high compression strength.

8. The cable of claim 6 wherein a plurality of said optical fibers and the metal lead are located in at least one of said grooves, the plural fibers and metal lead in said at least one of said grooves being surrounded by a viscous expanding mass filling at least the bottom of said at least one of said grooves.

9. The cable of claim 8 further including an outer jacket in abutting relation with the periphery of the metal jacket, the viscous mass filling the grooves while avoiding contact with the outer jacket to prevent stresses exerted on the outer jacket from being transmitted to the fibers in the grooves.

10. The optical cable of claim 5 further including means at said one end of the cable for measuring the capacitance between the electric lead having a tendency to break and said jacket.

11. In combination, an optical cable including: plural elongated optical fibers, at least one elongated electric lead, at least one elongated electric conductor insulated from the electric lead, the electric lead having an elongation on break which is no greater than the elongation on break of the optical fibers, the electric conductor having an elongation on break much greater than that of the optical fibers, the effects of tension on the cable tending to cause cracks or breaks in the fibers without causing breaks in the cable, the electric lead having an elongation on break no greater than the elongation on break of the optical fibers breaking in the vicinity of the crack or break of the optical fiber, the capacitance at one end of the cable between the electric lead and the electric conductor providing an indication of the location of the break; and means at said one end of the cable for measuring the capacitance between the electric lead and the electric conductor.

12. An optical fiber cable comprising first and second adjacent cable sections, each of said sections including: plural longitudinally extending optical fibers, a longitudinally extending electric conductor, and a longitudinally extending electric lead having an elongation on break no greater than that of the optical fibers, the electric conductor having an elongation on break much greater than that of the optical fibers, the effects of tension on the cable tending to cause cracks or breaks in the fibers without causing breaks in the cable, the electric lead having an elongation on break no greater than the elongation on break of the optical fibers breaking in the vicinity of the crack or break of the optical fiber, the cable, electric lead and the electric conductor being constructed and arranged so that electric capacitance at one end of the cable between the electric lead and the electric conductor provides an indication of the location of the break; and a repeater connected between the first and second sections, the repeater including: first and second electrically conductive tying members for respectively electrically connecting the electric leads and conductors of the first and second sections together.

13. The cable of claim 12 further including a mechanical strength member formed as a central longitudinally extending member, the longitudinally extending member including the longitudinally extending conductor.

14. The cable of claim 12 further including a longitudinally extending support member for the plural fibers, said support member having an embedded metal strand forming the electric conductor.

15. The cable of claim 12 further including a longitudinally extending sheath including a longitudinally extending jacket, the lead being embedded in the jacket.

16. The cable of claim 12 further including a tube coaxial with the cable longitudinal axis, the lead being located in the tube.

17. The cable of claim 12 wherein the mechanical strength member includes a bundle of longitudinally extending electrically conducting wires, the conductor being one of the wires.

18. The cable of claim 12 further including a longitudinally extending hydrophobic element in which the optical fibers and lead are embedded.

19. The cable of claim 12 further including a longitudinally extending elastomer element in which the optical fibers and lead are embedded.

20. The cable of claim 12 further including a longitudinally extending viscous element in which the optical fibers and lead are embedded.

21. The cable of claim 12 further including a longitudinally extending core including a grooved cylinder, the lead being contained in a groove of the cylinder.

22. The cable of claim 21 further including an amorphous mass filling the bottom of the groove containing the lead, one of the optical fibers being embedded in the amorphous mass.

23. The cable of claim 21 wherein said electric lead is anchored by bonding into the groove containing the lead.

24. The cable of claim 12 further including insulating cladding surrounding the lead.

25. The cable of claim 24 wherein the cladding has a polypropylene base.

26. The cable of claim 24 wherein the cladding has a high density polyethylene base.

27. The cable of claim 12 wherein the electric lead is selected from the group consisting essentially of hard copper, hard brass, lead-based hard brass, hard bronze, zinc based hard bronze, and hard aluminum alloy.

* * * * *